Patented April 4, 1972

INVENTOR
D. MAC NAIR
BY
ATTORNEY

United States Patent

MacNair

[15] 3,653,960

[45] Apr. 4, 1972

[54] GAS LASER INCLUDING CATHODE ELEMENT

[72] Inventor: Donald MacNair, Berkeley Heights, N.J.

[73] Assignee: Bell Telephone Laboratories, Incorporated, Murray Hill, Berkeley Heights, N.J.

[22] Filed: Mar. 23, 1970

[21] Appl. No.: 21,854

Related U.S. Application Data

[63] Continuation of Ser. No. 847,516, July 18, 1969, abandoned, which is a continuation of Ser. No. 568,497, July 28, 1966, abandoned.

[52] U.S. Cl..............................117/221, 117/223, 252/520, 252/521, 313/346, 330/41
[51] Int. Cl.......................................................H01s 3/22
[58] Field of Search...............117/221, 2; 252/520; 313/346; 330/41, 4.3

[56] References Cited

UNITED STATES PATENTS

| | | | |
|---|---|---|---|
| 3,155,864 | 11/1964 | Coppola | 117/223 X |
| 1,823,984 | 9/1931 | Nocolson | 117/219 |
| 3,188,236 | 6/1965 | Speros | 117/220 |

Primary Examiner—Ralph S. Kendall
Attorney—R. J. Guenther and Edwin B. Cave

[57] ABSTRACT

A gas laser including a cathode member comprising a platinum containing base member having an emissive coating deposited thereon comprising at least 90 percent barium zirconate, remainder barium oxide.

2 Claims, 3 Drawing Figures

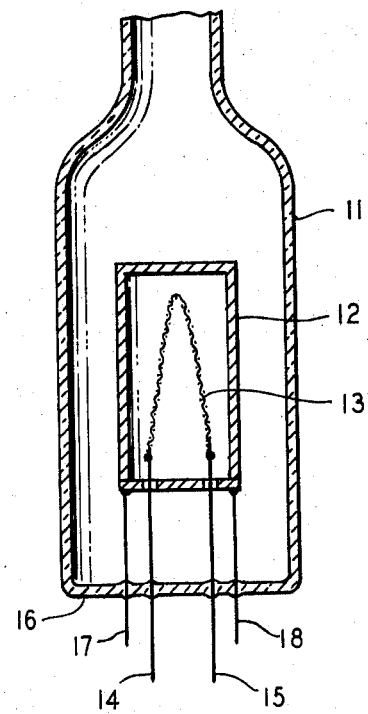

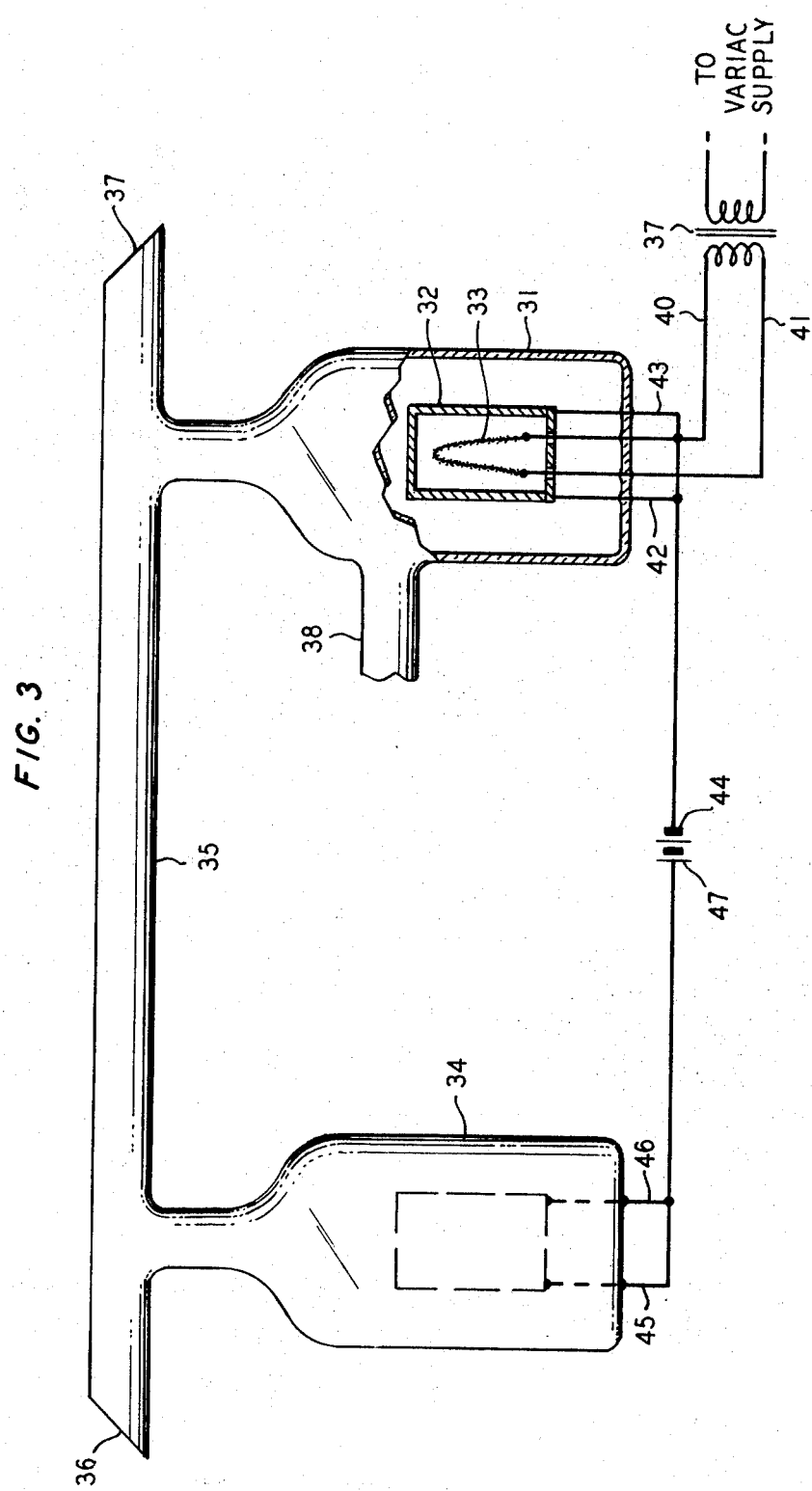

GAS LASER INCLUDING CATHODE ELEMENT

This is a continuation of application, Ser. No. 847,516, filed July 18, 1969, now abandoned which was a continuation of copending application, Ser. No. 568,497, filed July 28, 1966 now abandoned.

This invention relates to gas lasers and to cathode elements destined for use therein. More particularly, the present invention relates to gas lasers including cathode elements capable of operating in oxygen containing ambients.

Recently, considerable interest has been generated in the electronics industry in laser devices which operate in a reactive gaseous ambient. In the operation of such devices, it is conventional to employ a thermionic tube including a cathode element capable of performing at high current levels for the purpose of ionizing the gaseous medium. Unfortunately, cathodes presently marketed commercially are only operative at the desired current levels in the absence of reactive electronegative gases such as carbon dioxide, oxygen, water vapor, etc.

In accordance with the present invention, a cathode element capable of functioning at high current levels either in vacuum or in an oxidizing ambient is described. This element, which includes a coating of at least 90 percent, by weight, of barium zirconate upon a noble metal base or alloy thereof exhibits a degree of current density for a given configuration and operating conditions which is comparable to that attained by any conventional cathode structure capable of functioning only in vacuum. Operation of the described cathode in vacuum is successfully effected by including up to 10 percent, by weight, of a barium compound in the coating, such compound decomposing upon a vacuum station to yield barium oxide.

The invention will be more readily understood by reference to the following detailed description taken in conjunction with the accompanying drawing wherein:

FIG. 3 is a schematic representation of a typical gas laser system utilizing the inventive cathode structure.

Figure 1:
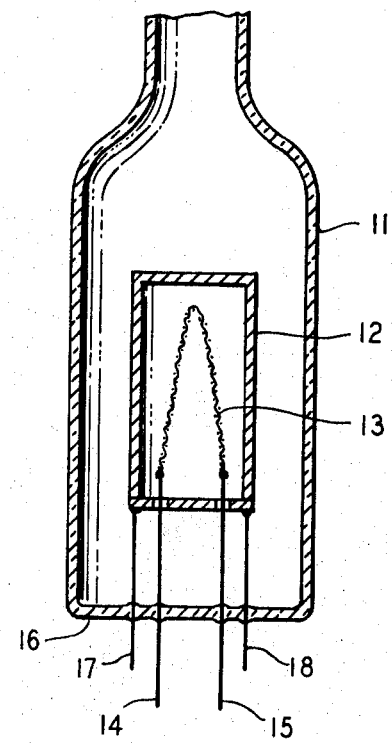
FIG. 1 is a front elevational view in section of a cathode structure utilizing a cathode element of the invention.

With reference now more particularly to FIG. 1, there is shown a structure containing the inventive cathode element. Such structure includes outer envelope 11, containing cylindrical heat shield 12 comprising platinum, rhodium, iridium or alloys thereof having contained therein cathode element 13. Element 13 is hairpin shaped and comprises a base of platinum, rhodium, iridium or alloys thereof having an emissive surface comprising at least 90 percent, by weight, barium zirconate of a thickness ranging from $0.5^{-2}$ mils. Paired electrical leads 14 and 15 make connection with cathode 13 and pass through glass base 16 which is hermetically sealed with envelope 11. Similarly, paired electrical leads 17 and 18 make connection with heat shield 12 and pass through base 16.

Figure 2:
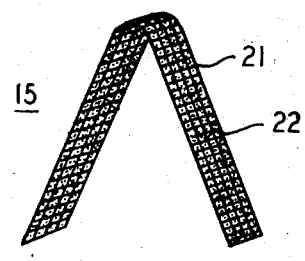
FIG. 2 is a perspective view of the cathode structure described herein.

The structure and cathode element described herein may be more fully appreciated by reference to FIG. 2 wherein there is shown a perspective view of the element. Shown in the figure is base member 21 having deposited thereon emissive coating 22 covering the entire surface thereof.

FIG. 3 is a schematic representation of a carbon dioxide-nitrogen laser utilizing the described cathode. The figure shows a cathode structure 31, of the type shown in FIG. 1, including cathode element 32 and heat shield 33, and an anode structure 34. Cathode 31 and anode 34 are both shown connected hermetically to glass tube 35 having a pair of optically polished Brewster angle windows 36 and 37. Cathode structure 31 is also connected to a vacuum pump and gas source (not shown) by means of conduit 38 and to a heat source 39 through paired electrical leads 40 and 41, respectively, which are connected to element 32. Heat shield 33 is connected by means of paired electrical leads 42 and 43 to the negative pole of a d-c source 44. Anode 34 is connected by means of paired electrical leads 45 and 46 to the positive pole 47 of the said d-c source.

In the operation of the device, cathode structure 31 is evacuated to a pressure of order of $10^{-6}$ millimeters of mercury. Following cathode element 32 is heated to a temperature of approximately 900° C., a mixture of carbon dioxide and nitrogen (0.5 torr. of each) admitted to the system via conduit 38 and a difference of potential impressed between anode and cathode, so resulting in ionization of the gaseous medium. The radiation developed within the discharge plasma glass 33 then passes through windows 36 and 37.

A general outline of a method suitable for use in the manufacture of a cathode element of this invention is set forth below. Certain operating parameters and types of starting materials are indicated.

The base material selected for the practice of the invention may be selected from among platinum, iridium, rhodium or alloys thereof. The material employed is obtained from commercial sources in wire, screen or any other solid form suitable for the desired configuration and operating characteristics. The grade of metal or alloy chosen should be as nearly pure as practicable so as not to contain any contaminants which may impair the emitting characteristics of the final structure. The emitting mixture selected for use in the novel structure includes at least 90 percent, by weight, barium zirconate. This material may be obtained from commercial sources and is typically of reagent grade purity.

Although the particle size of the emitting mixture is not critical, a general preference exists for fine particles generally ranging from 25 to 100 microns.

In those instances when it is desired to operate the described cathode structure not only in an oxidizing ambient, but also in vacuum, it is necessary to add up to 10 percent, by weight, of the emitting mixture of a well-known emitting composition. These materials usually contain a barium compound which will break down on a vacuum station to yield barium oxide. For the purpose of the invention, any barium compound which will thermally decompose at a temperature of less than 1,000° C. (and which will not react with barium zirconate) to yield barium oxide is suitable. Such materials include the single carbonate material, barium carbonate, the double carbonate material, coprecipitated barium strontium carbonate; and the triple carbonate material coprecipitated barium strontium calcium carbonate. In general, it has been found that the double carbonate is to be preferred over the single and that little further advantage is gained by the use of the triple carbonate. The double carbonate most commonly available for this purpose is a coprecipitant of equimolar portions of barium carbonate and strontium carbonate. The particle size of this emitting mixture is not critical, a preference again existing for fine particles. A commercially available coprecipitant containing particles, 90 percent of which are smaller than 10 microns has been found satisfactory.

In addition to the barium zirconate with or without the carbonate, a binder material may be added. The material selected may be nitrocellulose or any suitable material well known to those skilled in the cathode art such as isobutyl methacrylate, acetone solutions of stearic acid, etc. Binders are added to the mixture in minimum quantities (2 to 4 percent, by weight, of the total mixture) to assure maximum density.

The following is an outline of the procedure to be followed in producing a cathode element from the above materials.

The base material is initially cleaned by conventional vapor degreasing techniques well known to those skilled in the art. The cleaned base may then be stored until required.

The emitting mixture is produced by mixing barium zirconate with a binder alone or in combination with a portion of single, double or triple carbonate in a ball mill for time periods ranging from 50 to 100 hours. The next stage in the fabrication of the inventive structure involves coating the base with the emitting mixture by conventional spraying or dipping techniques. After deposition of the emissive coating material, the cathode is mounted as shown in FIG. 1 and the structure heat treated in vacuum.

In brief, the procedure employed consists of sealing the element in a vacuum station and evacuating to a pressure ranging from $10^{-4}$ to $10^{-9}$ millimeters of mercury. The cathode is then heated to about 1,000° C. for the purpose of eliminating occluded gases, and in those cases where a carbonate is present in the emitting mixture for the additional purpose of converting the carbonate to the corresponding oxide. For operation in vacuum, the structure is now completed and by heating to a temperature within the range of 800°–900° C. and applying an anode potential current may be drawn. For operation in an oxidizing ambient, the structure is filled with the desired gaseous medium, for example, air, carbon dioxide, oxygen, water vapor, carbon dioxide-nitrogen mixtures, etc. The partial pressure of the gaseous medium in the structure may range from 0.01 torr. to atmospheric pressure. Current may then be drawn in the manner described.

In order that those skilled in the art may more fully understand the inventive concept herein present, the following examples are given by way of illustration and not limitation.

EXAMPLE I

A cathode element of the type shown in FIG. 1 was prepared as follows: A platinum-rhodium screen (45 × 45 mesh containing 0.008 inches diameter platinum wire) 4 × ¼ inches of 99.9 percent purity, obtained from commercial sources, was vapor degreased and cleaned ultrasonically by conventional techniques with trichloroethylene. Next, the screen was rinsed in acetone. An emitting mixture was prepared by mixing 50.0 grams of reagent grade barium zirconate with 10 cubic centimeters of nitrocellulose solution and 10 cubic centimeters of amyl acetate for 50 hours in a conventional ball mill. The resultant mixture containing particles ranging in size from 25 to 100 microns was next sprayed by conventional techniques upon both surfaces of the platinum screen until a coating thickness of 1 mil was obtained. Next the platinum screen was mounted in a glass envelope by spot welding techniques and the resultant structure evacuated to a pressure of $10^{-6}$ millimeters. Then, the cathode element was heated to 1,000° C. to remove occluded gases, cooled to room temperature and filled with a carbon dioxide-nitrogen mixture to a pressure of 1 torr. (one-half torr. of each). Finally, the structure was heated to 1,000° C., an anode potential applied and current drawn. The structure drew 0.05 ampere/cm.$^2$ for greater than 1,000 hours.

EXAMPLE II

The procedure of Example I was repeated with the exception that 45 grams of barium zirconate and 5 grams of coprecipitated barium strontium carbonate were employed. At 1,000° C. the resultant structure evidenced a current carrying capacity of 0.05 ampere/cm.$^2$ in vacuum, upon application of an anode potential.

While the invention has been described in detail in the foregoing specification and drawing, the aforesaid is by way of illustration only and it is not restrictive in character. The several modifications which will readily suggest themselves to persons skilled in the art are all considered within the broad scope of the invention, reference being had to the appended claims.

I claim:

1. Gas laser including a cathode member, an anode member, means for introducing a reactive electronegative gas thereto, means for heating said cathode member and means for impressing a difference of potential between said cathode and anode members, characterized in that said cathode member comprises a base member selected from the group consisting of platinum, rhodium, iridium and alloys thereof, said base member having an emissive coating consisting essentially of at least 90 percent, by weight, barium zirconate, remainder alkaline earth oxide.

2. Device in accordance with claim 1 wherein said emissive coating comprises 100 percent, by weight, barium zirconate.

* * * * *